(12) United States Patent
Beier

(10) Patent No.: US 11,988,338 B2
(45) Date of Patent: May 21, 2024

(54) METHOD FOR OPERATING A TANK DEVICE FOR STORING COMPRESSED FLUIDS

(71) Applicant: Robert Bosch GmbH, Stuttgart (DE)

(72) Inventor: Marco Beier, Rudolstadt (DE)

(73) Assignee: Robert Bosch GmbH, Stuttgart (DE)

( * ) Notice: Subject to any disclaimer, the term of this patent is extended or adjusted under 35 U.S.C. 154(b) by 372 days.

(21) Appl. No.: 17/413,602

(22) PCT Filed: Nov. 18, 2019

(86) PCT No.: PCT/EP2019/081593
§ 371 (c)(1),
(2) Date: Jun. 14, 2021

(87) PCT Pub. No.: WO2020/120072
PCT Pub. Date: Jun. 18, 2020

(65) Prior Publication Data
US 2022/0042652 A1 Feb. 10, 2022

(30) Foreign Application Priority Data
Dec. 13, 2018 (DE) ...................... 10 2018 221 600.2

(51) Int. Cl.
*F17C 13/04* (2006.01)
*F17C 13/02* (2006.01)
*G05D 16/20* (2006.01)

(52) U.S. Cl.
CPC ............ *F17C 13/04* (2013.01); *F17C 13/025* (2013.01); *G05D 16/2022* (2019.01);
(Continued)

(58) Field of Classification Search
None
See application file for complete search history.

(56) References Cited

U.S. PATENT DOCUMENTS 6,751,542 B2 * 6/2004 Ishii ........................ F16H 61/30
701/56
2006/0219298 A1 10/2006 Suzuki
(Continued)

FOREIGN PATENT DOCUMENTS

CN         205429072 U  *  8/2016
DE     102006044364 A1     4/2007
(Continued)

OTHER PUBLICATIONS

Flow of fluids through valves, fittings and pipe, 1988, 3-4 (Year: 1988).*

(Continued)

*Primary Examiner* — Angelisa L. Hicks
(74) *Attorney, Agent, or Firm* — Michael Best & Friedrich LLP

(57) ABSTRACT

The invention relates to a method (200) for operating a tank device (1) for storing compressed fluids, having a tank (2), a valve device (100), a feed line (29), a flow-regulating element (27) situated in the feed line (29), and a control unit (64). The valve device (100) comprises a magnet apparatus (11), by means of which magnet apparatus (11) the opening and closing process of the valve device (100) can be controlled, the magnet apparatus (11) comprising a solenoid (10). A characteristic map (80) is stored in the control unit (64), in which characteristic map (80) reference pressure differences (70) with associated electrical current strengths for the solenoid (10) are stored, the electrical current strength being selected such that the valve device (100) is still open, an initial electrical current strength being stored in the characteristic map (80). The method is characterised by the following steps: a. applying (60) the initial electrical current strength to the solenoid (10); b. determining (61) the
(Continued)

pressure $p_0$ in the tank (2) and determining (61) the pressure $p_1$ in the feed line (29) between the valve device (100) and the flow-regulating element (27); c. determining (62) the difference between the pressure $p_0$ in the tank (2) and the pressure $p_1$ in the feed line (29) between the valve device (100) and the flow-regulating element (27); d. assigning the determined difference between the pressure $p_0$ in the tank (2) and the pressure $p_1$ in the feed line (29) between the valve device (100) and the flow-regulating element (27) to one of the reference pressure differences (70) in the characteristic map (80) such that,—if the determined difference between the pressure $p_0$ in the tank (2) and the pressure $p_1$ in the feed line (29) between the valve device (100) and the flow-regulating element (27) can be assigned to one of the reference pressure differences (70): i. selecting (64) an electrical current strength assigned to the determined reference pressure difference (70) for the solenoid (10); ii. applying (65) the selected electrical current strength to the solenoid (10); iii. cyclically repeating (66) steps a. to d.; —if the determined difference between the pressure $p_0$ in the tank (2) and the pressure $p_1$ in the feed line (29) between the valve device (100) and the flow-regulating element (27) cannot be assigned to one of the reference pressure differences (70): returning (67) to step a.

8 Claims, 2 Drawing Sheets

(52) U.S. Cl.
CPC ............ *F17C 2203/0617* (2013.01); *F17C 2205/0326* (2013.01); *F17C 2205/0382* (2013.01); *F17C 2205/0394* (2013.01); *F17C 2221/012* (2013.01); *F17C 2223/0123* (2013.01); *F17C 2250/0434* (2013.01); *F17C 2250/0636* (2013.01); *F17C 2270/0184* (2013.01)

(56) References Cited

U.S. PATENT DOCUMENTS

| 2009/0222179 | A1* | 9/2009 | Zheng | G05D 16/2013 |
| | | | | 701/58 |
| 2012/0109385 | A1 | 5/2012 | Morita et al. | |
| 2014/0239207 | A1* | 8/2014 | Ninomiya | F16K 31/42 |
| | | | | 251/30.01 |

FOREIGN PATENT DOCUMENTS

| DE | 102008039959 A1 | 5/2009 |
| DE | 102008058108 A1 | 5/2010 |
| DE | 102016008107 A1 | 1/2018 |
| DE | 102018209057 A1 | 12/2019 |
| EP | 2857727 A1 | 4/2015 |
| JP | 2007232151 A | 9/2007 |
| JP | 2009151997 A | 7/2009 |
| JP | 2016051585 A | 4/2016 |
| JP | 2016219227 A | 12/2016 |
| WO | 2020120072 A1 | 6/2020 |

OTHER PUBLICATIONS

Translation of International Search Report for Application No. PCT/EP2019/081593 dated Mar. 12, 2020 (3 pages).

* cited by examiner

METHOD FOR OPERATING A TANK DEVICE FOR STORING COMPRESSED FLUIDS

BACKGROUND OF THE INVENTION

The invention relates to a method for operating a tank device for storing compressed fluids, in particular a fuel cell tank for storing hydrogen, for example for use in vehicles with a fuel cell drive.

DE 10 2018 209 057 A1, which was not published before the priority date of the present application, describes a tank device for relieving a fuel cell tank of temperature-induced pressure, wherein the tank device comprises a tank vessel with various valves, such as for example a shut-off valve, which valves ensure orderly functioning for example of a fuel cell system.

The safety devices for such a tank device are standardized. Here, every tank device must have such a shut-off valve. Thus, in the event of damage to the tank device caused by an accident of the vehicle with a fuel cell drive, or in the event of a breakage of a line of the tank device, the shut-off valve can close the tank vessel such that no gas can escape from the storage unit.

In order to ensure orderly functioning of such a shut-off valve, a faultless opening and closing process of the shut-off valve must be ensured. An unregulated escape of hydrogen from the tank vessel can otherwise result.

SUMMARY OF THE INVENTION

The invention relates to a method for operating a tank device for storing compressed fluids and to a device for carrying out the method. In this way, a faultless opening and closing process of a valve device, which controls a flow cross section out of the tank device, can be ensured, wherein the sealing of the valve device is ensured in the event of an accident.

This is achieved by means of a method for operating a tank device for storing compressed fluids, having a tank, a valve device, a feed line, a throughflow regulating element arranged in the feed line, and a control unit, wherein the valve device comprises a magnet device, by means of which magnet device the opening and closing process of the valve device can be controlled, wherein the magnet device comprises a magnet coil, wherein a characteristic map is stored in the control unit, in which characteristic map reference pressure differences are stored with respectively associated electrical current intensities for the magnet coil, wherein the electrical current intensity is selected such that the valve device is still open, wherein an initial electrical current intensity is stored in the characteristic map, characterized by the following steps:

a. applying the initial electrical current intensity to the magnet coil;
b. ascertaining a pressure $p_0$ in the tank and ascertaining a pressure $p_1$ in the feed line between the valve device and the throughflow regulating element;
c. determining the difference between the pressure $p_0$ in the tank and the pressure $p_1$ in the feed line between the valve device and the throughflow regulating element;
d. assigning the determined difference between the pressure $p_0$ in the tank and the pressure $p_1$ in the feed line between the valve device and the throughflow regulating element to one of the reference pressure differences in the characteristic map such that, if the determined difference between the pressure $p_0$ in the tank and the pressure $p_1$ in the feed line between the valve device and the throughflow regulating element can be assigned to one of the reference pressure differences:
i. selecting an electrical current intensity, assigned to the determined reference pressure difference, for the magnet coil;
ii. applying the selected electrical current intensity to the magnet coil;
iii. cyclically repeating steps a. to d.

if the determined difference between the pressure $p_0$ in the tank and the pressure $p_1$ in the feed line between the valve device and the throughflow regulating element cannot be assigned to one of the reference pressure differences: returning to step a.

By means of the geometry of the valve device and the flow conditions at the valve device and at the throughflow regulating element, reference pressure differences can be ascertained, such that, from these, an electrical current intensity can be ascertained which is applied to the magnet coil. Here, this is selected such that, by means of the generated magnetic force, the pressure and flow forces on the valve device are compensated such that the valve device is just arranged in an open position. Now, if a pressure difference range which is not stored is reached between the pressure $p_0$ in the tank and the pressure $p_1$ in the feed line between the valve device and the throughflow regulating element, for example as a result of a breakage in the feed line, then the applied electrical current intensity at the magnet coil will no longer suffice to generate a sufficiently high magnetic force that counteracts the pressure and flow forces on the valve device. The consequence is that the valve device is closed and no further compressed medium can escape from the tank. An unregulated escape of compressed medium from the tank can thus be prevented, and optimum safety requirements can be attained.

In a first advantageous refinement of the invention, it is provided that the pressure difference between the pressure $p_0$ in the tank and the pressure $p_1$ in the feed line between the valve device and the throughflow regulating element is determined by the geometry of the valve device and/or by a flow cross section at the throughflow regulating element. It is thus possible, in a manner dependent on the volume flow of the gaseous medium, for the pressure difference to be controlled for example by means of the throughflow regulating element.

In one advantageous refinement, it is provided that the pressure $p_1$ in the feed line between the valve device and the throughflow regulating element is ascertained by means of a flow cross section at the throughflow regulating element. It is thus easily possible for the pressure $p_1$ in the feed line between the valve device and the throughflow regulating element to be determined by means of the pressure $p_0$ in the tank and/or the flow cross section of hydrogen through the valve device.

In a further embodiment of the invention, it is advantageously provided that the pressure $p_0$ in the tank is measured continuously by means of a pressure measuring unit arranged in the tank. An optimum implementation of the method adapted to the actual conditions of the tank device can thus be achieved.

In one advantageous refinement, the tank comprises a tank housing with a neck region, in which neck region the valve device is arranged. Thus, the valve device is simultaneously integrated into the tank and thus protected against external influences such as, for example, damage as a result of vibrations.

A device configured for carrying out the method has the tank device and the control unit, by means of which control unit the method can be carried out.

In one advantageous refinement, the control unit comprises one control device or multiple control devices. The method can thus be carried out in a simple manner without physical restructuring of the tank device and without additional components.

The described method and the device are preferably suitable, in a fuel cell arrangement, for the supply of hydrogen to an anode region of the fuel cell.

BRIEF DESCRIPTION OF THE DRAWINGS

The drawing illustrates exemplary embodiments of a tank device according to the invention for storing compressed fluids and a flowchart of a method for operating such a tank device. In the drawing.

DETAILED DESCRIPTION

Figure 1:
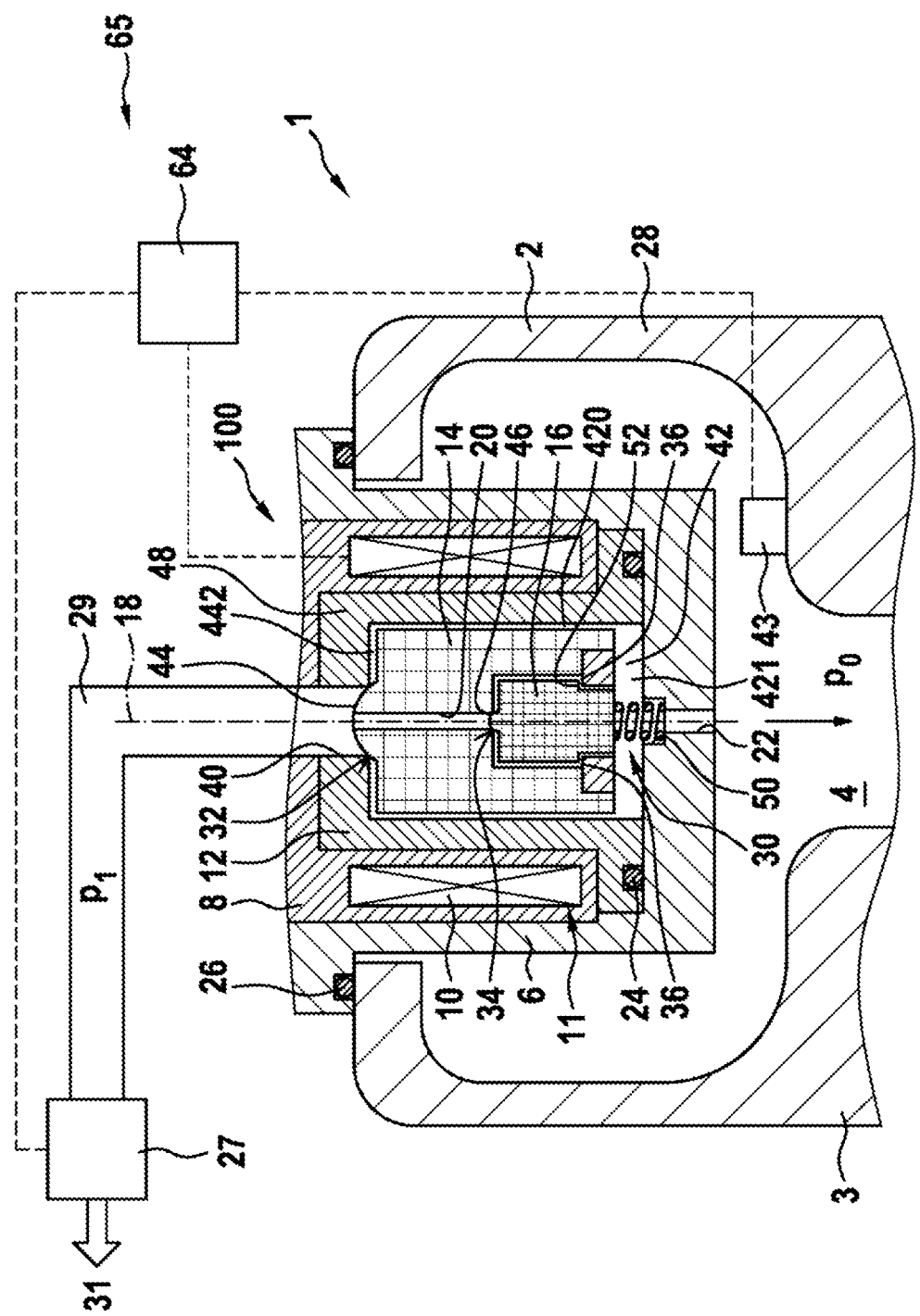
FIG. 1 shows an exemplary embodiment of a tank device according to the invention in longitudinal section.

FIG. 1 shows an exemplary embodiment of a tank device 1 according to the invention for storing compressed fluids, in particular hydrogen, having a valve device 100, in longitudinal section.

The valve device 100 has a valve housing 6 with a longitudinal axis 18. In the valve housing 6, there are formed an inlet opening 22 and an outlet opening 40, which open into an interior space 42. Furthermore, in the valve housing 6, there is arranged a magnet coil 10 with a coil housing 8. The valve housing 6 furthermore comprises a stop element 12 which is surrounded by the coil housing 8 and which seals off the magnet coil 10 with respect to the interior space 42 by means of sealing elements 24.

In the interior space 42, there is arranged a first magnet armature 14 which is movable along the longitudinal axis 18 and which interacts with a protuberance 44 with a first sealing seat 32 in order to open and close the outlet opening 40. Here, the first sealing seat 32 is formed on a shoulder 48 of the stop element 12. In the first magnet armature 14, there is formed a passage opening 20 which, at that end of the first magnet armature 14 which is averted from the first sealing seat 32, opens into a recess 38.

In the recess 38, there is received a second magnet armature 16 which is movable along the longitudinal axis 18 and which interacts with a protuberance 46 with a second sealing seat 34 in order to open and close the passage opening 20 in the first magnet armature 14. The second sealing seat 34 is formed on the first magnet armature 14.

By means of a spring 30 which is arranged in a recess 50 of the valve housing 6 and which is supported between the second magnet armature 16 and the valve housing 6, the second magnet armature 16 is acted on with a force in the direction of the second sealing seat 34, such that the second magnet armature 16 lies on the second sealing seat 34. The passage opening 20 is thus closed.

Owing to the operative connection of the first magnet armature 14 to the second magnet armature 16, the first magnet armature 14 is pressed by means of the spring 30 against the first sealing seat 32, such that the outlet opening 40 is closed. Furthermore, the first magnet armature 14 has a shoulder 36 which interacts with a shoulder 52 of the second magnet armature 16. Thus, during the opening of the second sealing seat 34, the second magnet armature 16 acts, during the longitudinal movement thereof, as a driver for the first magnet armature 14, whereby the opening of the first sealing seat 32 is accelerated.

The interior space 42 is divided by the first magnet armature 14 and the second magnet armature 16 into an outer annular space 422, an inner annular space 420 and a spring space 421. The outer annular space 422 is in this case delimited by the stop element 12 and the first magnet armature 14, whereas the inner annular space 420 is delimited by the first magnet armature 14 and the second magnet armature 16.

Both the inner annular space 420 and the outer annular space 422 open into the spring space 421, wherein the spring space 421 comprises the recess 50 of the valve housing 6 and transitions into the inlet opening 22.

The valve device 100 is part of a tank device 1 with a tank 2. The tank 2 has a tank housing 3 in which a tank interior space 4 is formed. The tank housing 3 has a neck region 28 in which the valve device 100 is arranged. Here, said valve device is integrated into the tank housing 3 and thus closes the tank interior space 4 to the outside. By means of sealing elements 26 between the valve housing 6 of the valve device 100 and the tank housing 3 of the tank 2, the tank interior space 4 is sealed off such that gaseous medium, in particular hydrogen, can flow in and out of the tank 2 only via the valve device 100.

The first magnet armature 14 and the second magnet armature 16 together with the magnet coil 10 and the coil housing 8 form a magnet device 11.

Here, a flow cross section of the gaseous medium at the first sealing seat 32 is larger than a flow cross section of the gaseous medium at the second sealing seat 34, because the diameter of the outlet opening 40 of cylindrical form is larger than the diameter of the cylindrical passage opening 20. The second sealing seat 34 can thus be opened up by a low magnetic force, wherein, as a result of opening of the second sealing seat 34, the pressure conditions at the first sealing seat 32 are changed such that the required magnetic force for opening the first sealing seat 32 is no longer as high as in the case of the second sealing seat 34 and the second magnet armature 16 being omitted. Thus, a low magnetic force is required overall for the opening of the valve device 100.

The outlet opening 40 is fluidically connected to a feed line 29, wherein a throughflow regulating element 27 is arranged in the feed line 29, which throughflow regulating element controls the compressed fluid in the direction of a consumer 31, in this case a fuel cell arrangement, with hydrogen from the tank device 1. A pressure $p_1$ prevails in the feed line 29 between the throughflow regulating element 27 and the valve device 100.

Furthermore, a pressure measuring unit 43 is arranged in the tank interior space 4 such that a pressure $p_0$ in the tank interior space 4 can be ascertained and monitored.

The pressure $p_1$ can thus be determined by means of the pressure $p_0$ in the tank interior space 4, the flow cross section of hydrogen at the valve device 100 in the case of a known geometry of the valve device 100, and the flow cross section of hydrogen at the pressure regulating element 27.

Also provided is a device 65 with a control unit 64 which is operatively connected to the pressure regulating element 27, the pressure measuring unit 43 and the magnet coil 10.

The pressure $p_0$ prevails in the tank 2. If the valve device 100 is in an open position, that is to say the first sealing seat 32 and the second sealing seat 34 are opened up and the tank 2 is fluidically connected to the feed line 29, and if the throughflow regulating element 27 does not control any compressed fluid in the direction of the consumer 31, then the same pressure as in the tank 2 also prevails in the feed line 29 between the valve device 100 and the throughflow regulating element 27. That is to say, $p_0=p_1$.

If the throughflow regulating element 27 controls compressed fluid in the direction of the consumer 31, then the pressure $p_1$ in the feed line 29 between the valve device 100 and the throughflow regulating element 27 decreases, that is to say $p_0 > p_1$. Here, the difference between $p_0$ and $p_1$ is jointly determined by the outflow cross sections at the first sealing seat 32 and at the second sealing seat 34 of the compressed fluid in the valve device 100, caused by the geometry of the valve device 100 and a flow cross section at the throughflow regulating element 27.

The difference between $p_0$ and $p_1$, that is to say the pressure and flow forces in the valve device 100, the tank 2 and the feed line 29, acts as a closing force on the first magnet armature 14, such that a higher magnetic force is required in order to open, or hold open, the first sealing seat 32.

Below, a method will be described in which, during typical operation of the tank device 1, the magnetic force is adapted to the expected pressure and flow forces on the first magnet armature 14 and, in the event of pressure differences arising for example in the event of a line breakage or a faulty throughflow regulating element 27, the magnetic force is no longer sufficient to hold the first sealing seat 32 open. An outflow of hydrogen from the tank 2 is thus prevented.

Figure 2:
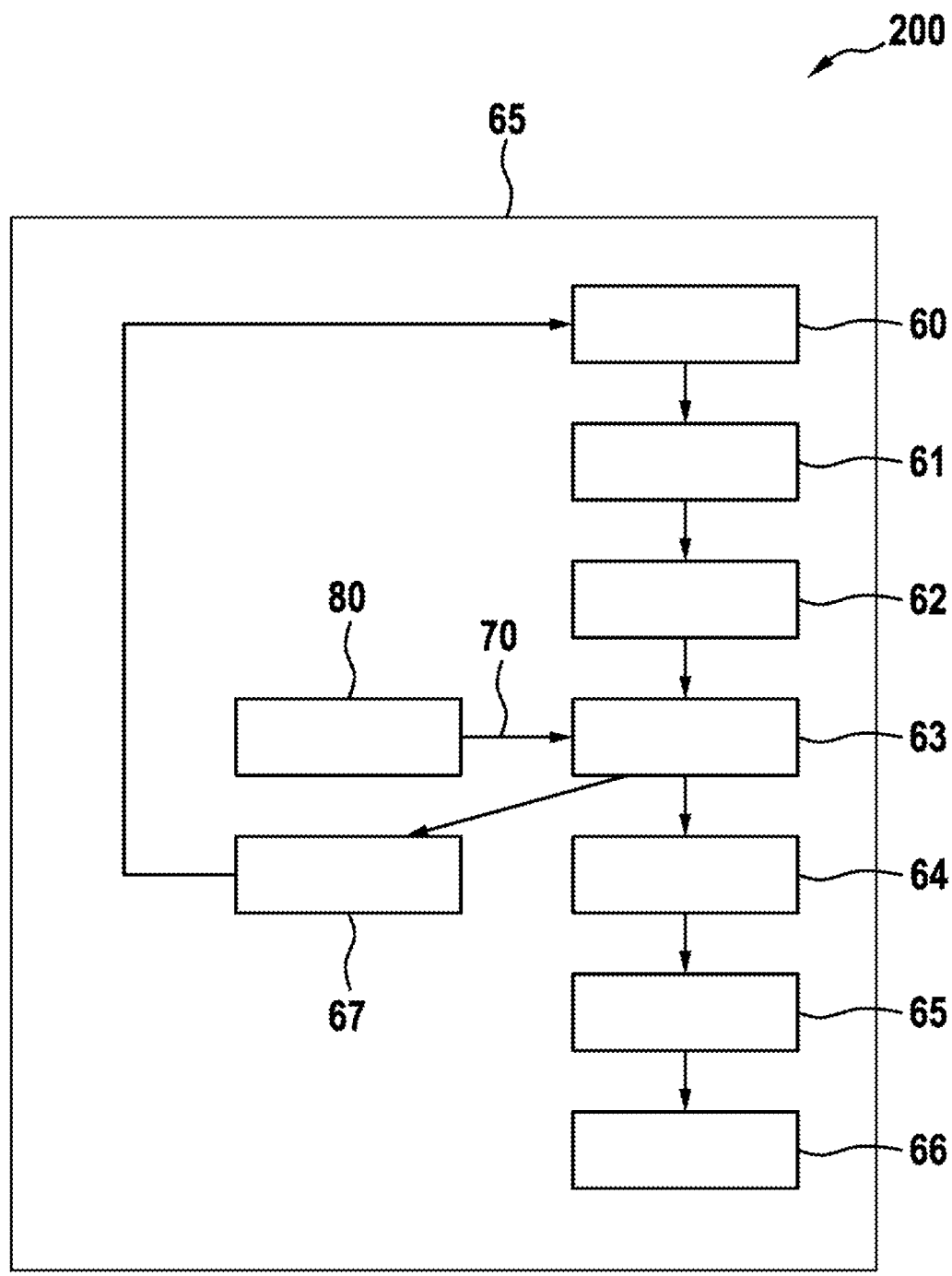
FIG. 2 shows a flow diagram for an exemplary embodiment of a method according to the invention for operating a tank device.

FIG. 2 shows a flow diagram of a method 200 according to the invention for operating the tank device 1 for storing compressed fluids, wherein the flow diagram will be discussed below:

In the control unit 64, there is stored a characteristic map 80 in which there are stored reference pressure differences 70 with respectively associated electrical current intensities for the magnet coil 10. Here, the electrical current intensity is selected such that the valve device is still open, that is to say the magnetic force on the first magnet armature 14 and the second magnet armature 16 is still just sufficient to hold the first sealing seat 32 and the second sealing seat 34 open.

Furthermore, in the characteristic map 80, there is stored an initial electrical current intensity which may for example correspond to a value of 0 A. The value range of this initial electrical current intensity may also lie in a range that are typically stored in the characteristic map 80 for the reference pressure differences 70.

In a first step of the method 200, this initial electrical current intensity is applied to the magnet coil 10 (applying, 60).

By means of the pressure measuring unit 43 and/or by means of known geometry of the valve device 100 and/or the flow cross section at the throughflow regulating element 27, the pressure $p_0$ in the tank 2 and the pressure $p_1$ in the feed line 29 between the valve device 100 and the throughflow regulating element 27 are ascertained (ascertaining, 61).

The difference between the pressure $p_0$ in the tank 2 and the pressure $p_1$ in the feed line between the valve device 100 and the throughflow regulating element 27 is determined (determining, 62).

The determined difference between the pressure $p_0$ in the tank 2 and the pressure $p_1$ in the feed line between the valve device 100 and the throughflow regulating element 27 is then assigned to one of the reference pressure differences 70 in the characteristic map 80 (assigning, 63). This is performed such that, if the determined difference between the pressure $p_0$ in the tank 2 and the pressure $p_1$ in the feed line 29 between the valve device 100 and the throughflow regulating element 27 can be assigned to one of the reference pressure differences 70, then an electrical current intensity, assigned to the determined reference pressure difference 70, for the magnet coil 10 is selected (selecting, 64) and applied to the magnet coil 10 (applying 65). Thereafter, all of the abovementioned steps are cyclically repeated (cyclically repeating, 66) for effective functioning of the tank device 1 as a whole.

If it is not possible to assign the determined difference between the pressure $p_0$ in the tank 2 and the pressure $p_1$ in the feed line 29 between the valve device 100 and the throughflow regulating element 27 to one of the reference pressure differences 70 (assigning, 63), then the method 200 is carried out again from the outset (returning, 67).

This situation arises for example if no value range is stored for the determined difference between the pressure $p_0$ in the tank 2 and the pressure $p_1$ in the feed line 29 between the valve device 100 and the throughflow regulating element 27, because said value does not arise in the typical operating method.

It is thus then possible for the magnetic force which is generated by the magnet coil 10 and which acts on the first magnet armature 14 and the second magnet armature 16 to be adapted to the actually prevailing pressure and flow forces in the tank device 1. However, if pressure differences between $p_0$ and $p_1$ are reached which are not stored as reference pressure differences 70 in the control unit 64, then the applied electrical current intensity at the magnet coil 10 no longer suffices to hold the first sealing seat 32 and the second sealing seat 34 open. The valve device 100 closes, and no compressed fluid passes out of the tank 2. It can thus be ensured that, for example in the event of faulty functioning of the throughflow regulating element 27 or in the event of possible damage to the tank device 1, the valve device 100 is closed and the tank 2 is closed off.

The method 200 according to the invention is carried out by the control unit 64, which may comprise one control device or multiple control devices. Furthermore, the actuation of the magnet coil 10, the actuation of the throughflow regulating element 27 and the actuation of the pressure measuring units 43, 45 can be controlled in closed-loop fashion by means of the control unit 64.

The described method and the device are suitable, for example in a fuel cell arrangement, for controlling a supply of hydrogen to an anode region of a fuel cell.

The invention claimed is:

1. A method (200) for operating a tank device (1) for storing compressed fluids, having a tank (2), a valve device (100), a feed line (29), a throughflow regulating element (27) arranged in the feed line (29), and a control unit (64), wherein the valve device (100) comprises a magnet device (11), by means of which magnet device (11) the opening and closing process of the valve device (100) can be controlled, wherein the magnet device (11) comprises a magnet coil (10), wherein a characteristic map (80) is stored in the control unit (64), in which characteristic map (80) reference pressure differences (70) are stored with respectively associated electrical current intensities for the magnet coil (10), wherein the electrical current intensity is selected such that the valve device (100) is still open, wherein an initial electrical current intensity is stored in the characteristic map (80), the method comprising the following steps:

a. applying (60) the initial electrical current intensity to the magnet coil (10);
b. ascertaining (61) a pressure $p_0$ in the tank (2) and ascertaining (61) a pressure $p_1$ in the feed line (29) between the valve device (100) and the throughflow regulating element (27);
c. determining (62) the difference between the pressure $p_0$ in the tank (2) and the pressure $p_1$ in the feed line (29) between the valve device (100) and the throughflow regulating element (27);
d. assigning (63) the determined difference between the pressure $p_0$ in the tank (2) and the pressure $p_1$ in the feed line (29) between the valve device (100) and the throughflow regulating element (27) to one of the reference pressure differences (70) in the characteristic map (80) such that,
when the determined difference between the pressure $p_0$ in the tank (2) and the pressure $p_1$ in the feed line (29) between the valve device (100) and the throughflow regulating element (27) can be assigned to one of the reference pressure differences (70):
i. selecting (64) an electrical current intensity, assigned to the determined reference pressure difference (70), for the magnet coil (10);
ii. applying (65) the selected electrical current intensity to the magnet coil (10);
iii. cyclically repeating (66) steps a. to d.;
when the determined difference between the pressure $p_0$ in the tank (2) and the pressure $p_1$ in the feed line (29) between the valve device (100) and the throughflow regulating element (27) cannot be assigned to one of the reference pressure differences (70): returning (67) to step a.

2. The method (200) as claimed in claim 1, wherein the pressure difference between the pressure $p_0$ in the tank (2) and the pressure $p_1$ in the feed line (29) between the valve device (100) and the throughflow regulating element (27) is determined by the geometry of the valve device (100) and/or by a flow cross section at the throughflow regulating element (27).

3. The method (200) as claimed in claim 1, wherein the pressure $p_1$ in the feed line (29) between the valve device (100) and the throughflow regulating element (27) is ascertained by means of a flow cross section at the throughflow regulating element (27).

4. The method (200) as claimed in claim 1, wherein the pressure $p_0$ in the tank (2) is measured continuously by means of a pressure measuring unit (43) arranged in the tank (2).

5. The method (200) as claimed in claim 1, wherein the tank (2) comprises a tank housing (3) with a neck region (28), in which neck region (28) the valve device (100) is arranged.

6. A device (65), having a tank device (1) and a control unit (64), configured to
a. apply (60) an initial electrical current intensity to a magnet coil (10);
b. ascertain (61) a pressure p0 in a tank (2) and ascertain (61) a pressure p1 in a feed line (29) between a valve device (100) and a throughflow regulating element (27);
c. determine (62) the difference between the pressure p0 in the tank (2) and the pressure p1 in the feed line (29) between the valve device (100) and the throughflow regulating element (27);
d. assign (63) the determined difference between the pressure p0 in the tank (2) and the pressure p1 in the feed line (29) between the valve device (100) and the throughflow regulating element (27) to one of a plurality of reference pressure differences (70) in a characteristic map (80) such that,
when the determined difference between the pressure p0 in the tank (2) and the pressure p1 in the feed line (29) between the valve device (100) and the throughflow regulating element (27) can be assigned to one of the reference pressure differences (70):
i. select (64) an electrical current intensity, assigned to the determined reference pressure difference (70), for the magnet coil (10);
ii. apply (65) the selected electrical current intensity to the magnet coil (10);
iii. cyclically repeat (66) acts a. to d.;
when the determined difference between the pressure p0 in the tank (2) and the pressure p1 in the feed line (29) between the valve device (100) and the throughflow regulating element (27) cannot be assigned to one of the reference pressure differences (70): return (67) to step a.

7. The device (65) as claimed in claim 6, wherein the control unit (64) comprises one control device or multiple control devices.

8. A fuel cell arrangement having a device (65) as claimed in claim 6 comprising:
a device (65), having a tank device (1) and a control unit (64), configured to
a. apply (60) an initial electrical current intensity to a magnet coil (10);
b. ascertain (61) a pressure p0 in a tank (2) and ascertain (61) a pressure p1 in a feed line (29) between a valve device (100) and a throughflow regulating element (27);
c. determine (62) the difference between the pressure p0 in the tank (2) and the pressure p1 in the feed line (29) between the valve device (100) and the throughflow regulating element (27);
d. assign (63) the determined difference between the pressure p0 in the tank (2) and the pressure p1 in the feed line (29) between the valve device (100) and the throughflow regulating element (27) to one of a plurality of reference pressure differences (70) in a characteristic map (80) such that,
when the determined difference between the pressure p0 in the tank (2) and the pressure p1 in the feed line (29) between the valve device (100) and the throughflow regulating element (27) can be assigned to one of the reference pressure differences (70):
i. select (64) an electrical current intensity, assigned to the determined reference pressure difference (70), for the magnet coil (10);
ii. apply (65) the selected electrical current intensity to the magnet coil (10);
iii. cyclically repeat (66) acts a. to d.;
when the determined difference between the pressure p0 in the tank (2) and the pressure p1 in the feed line (29) between the valve device (100) and the throughflow regulating element (27) cannot be assigned to one of the reference pressure differences (70): return (67) to step a.

* * * * *